United States Patent Office 3,702,135
Patented Nov. 7, 1972

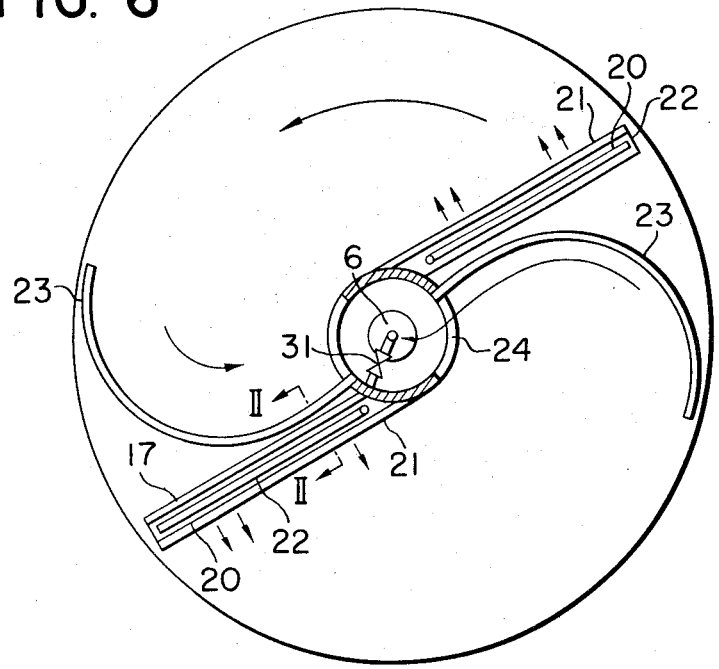
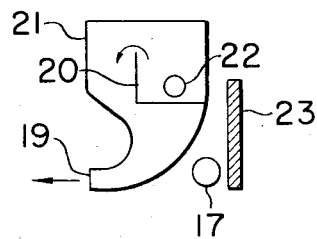
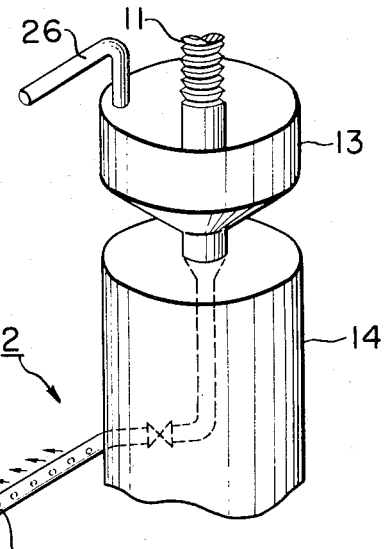
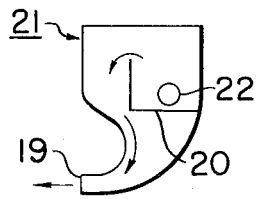

3,702,135
FILTRATION APPARATUS FOR USE IN TREATING SLUDGE
Shiro Takahashi and Tadao Horiguchi, Yokohama, Japan, assignors to Kurita Water Industries Ltd., Higashe-ku, Osaka-shi, Japan
Filed Feb. 12, 1971, Ser. No. 114,904
Claims priority, application Japan, Feb. 16, 1970, 45/13,288
Int. Cl. B01d 23/20
U.S. Cl. 210—270                                7 Claims

ABSTRACT OF THE DISCLOSURE

A method of treating sludge comprising the steps of dehydrating the sludge arising from the treatment of water, waste liquid, etc., by spreading it on a filter material and raking off the dehydrated sludge together with the surface layer of said filter material, and an apparatus pertaining to said method.

BACKGROUND OF THE INVENTION

(a) Field of the invention

The present invention relates to a method of treating efficiently the sludge arising from the treatment of water, waste liquid, etc., as well as an apparatus pertaining to said method.

(b) Description of the prior art

The conventional treatment of city water, industrial water, sewage, industrial waste liquid, etc., through physical, chemical or biological processes gives rise to so much sludge that it has hitherto been confronted with knotty problems. That is, the sludge arising from these processes is sometimes dehydrated by filtration, but the resulting cake is generally hard to exfoliate from the filter material and is apt to clog the meshes thereof to necessitate frequent washing of the filter material. Besides, the sludge being not so readily dehydrated, it has been usual to dehydrate it by filtration employing a great deal of filter assistant. Therefore, the treated sludge has not been suitable for incineration because of the inorganic filter assistant thus added, and it has been disposed of by burying in the ground and so on. In this context, however, in case the sludge comprises septic substances, it is necessary to stabilize it in advance by means of a digestion tank or the like to cope with the putrefaction thereof after disposal, which calls for the provision of appropriate disposal facilities as well as complicated operations relevant thereto. Another conventional means of treatment called the sludge-drying bed, which is so devised that the sludge is placed on a sand layer to thereby make water flow down to the bottom of the filter bed and also to evaporate from the surface thereof, is also inadvisable in view of the low efficiency of the dehydration and the requirement for an extensive site for facilities as well as the long period of time required for each cycle of dehydration (about 7 days). Moreover, even in this sludge-drying bed, there occurs putrefaction of the sludge and, therefore, not only is it necessary to digest septic sludge in advance to stabilize it but also it is difficult to incinerate the sludge due to the amount of the non-flammable sand which is mixed therein inasmuch as the dried sludge is raked out together with the sand of the air-dried filter bed.

SUMMARY OF THE INVENTION

The present invention overcomes the defects of the conventional methods so as to make the sludge into a dehydrated sludge efficiently and in a short time, rendering it combustible for incineration, and, as a result, the sludge need not be stabilized but can be treated efficiently even while in a septic state.

The present invention relates to a method of treating the sludge which is characterized by the steps of rapidly dehydrating the sludge by spreading it on a layer of pulverized coal, raking out the thus dehydrated sludge together with the pulverized coal forming the surface of said layer and incinerating the sludge thus raked out, as well as an apparatus pertaining to said method.

DESCRIPTION OF THE PREFERRED EMBODIMENTS

The present invention is intended for performing the dehydration of the sludge by the use of pulverized coal, but it is not characterized solely by the substitution of pulverized coal for the sand employed for the conventional sludge-drying bed; it is also characterized by the remarkable improvement in the dehydration efficiency compared with that of said sludge-drying bed. The sludge-drying bed is so devised that the sludge is loaded on the sand layer to a depth of 20~30 cm., thereby causing the free water flow down. In this case, however, there occurs the clogging of surface of the sand layer immediately after placing the sludge thereon, and, as a result, the flow of the water becomes slow and the dehydration is mostly effected by upward evaporation. Therefore, the dehydration efficiency is very low, and even the substitution of pulverized coal for the sand in such an air-dried filter bed leads to a similar effect and is of no practical use.

In this context, as a result of examinations of the filtration efficiency of the pulverized coal layer conducted by the present inventors, it was found that the surface portion of said layer become clogged in a few minutes or scores of minutes and that, although a rapid dehydration takes place before said clogging occurs, the dehydration efficiency after the occurrence of clogging is extremely reduced.

The following describes an example of the results of said examinations.

A dehydration tank having a filtration area of 3 m.$^2$ and provided with a filter bed packed with pulverized coal having a grain size of 0.3~1.6 mm. was stuffed with 0.84 m.$^3$ of active sludge (concentration: 12,000 p.p.m.) coming from a sewage treatment process, whereby dehydration of said sludge was carried out. The result was as shown by the graph in the appended FIG. 1. As is evident from this graph, there takes place a very rapid dehydration of the sludge for about 2 minutes subsequent to the pouring of the sludge and then the dehydration continues rapidly through at a progressively diminishing speed till about 40 minutes thereafter, but it make little progress thereafter.

Inasmuch as there takes place a rapid dehydration immediately after the pouring of sludge and the clogging of filter bed follows thereafter, it is natural that the dehydration should be efficiently performed by means of raking out the clogged surface of the filter bed together with the sludge deposited thereon and exposing a new surface of the filter layer free of said clogging to thereby resume the dehydration. In the conventional filtration of water, there has been practiced a method of continuing filtration by raking the surface of the filter bed. In this case, however, the raking operation is performed under water while continuing the filtration, so that the process of discharging the filter material thus raked off is not only complicated but is also incapable of highly concentrating the sludge in the filter material raked off for discharge, inasmuch as said discharge is usually performed by means of water and calls for an additional complex process of dehydration. Therefore, this method is not applicable to the dehydration of the sludge such as in the present invention.

According to the method of the present invention, a small amount of the sludge is spread on the layer of pulverized coal and the sludge thus dehydrated rapidly, is raked off together with the surface portion of said layer of filter material, to thereby expose a new surface on which new sludge is again spread for dehydration, and this operation is repeated. As to the pulverized coal, coal, charcoal or coke pulverized into the grain size of 0.1∼1.0 mm. is built into a filter bed by stratifying.

The amount of the sludge to be spread on the surface of said filter bed is such an amount that it permits the free water contained therein to flow out completely, and the precise amount of sludge depends upon the kind and concentration of the sludge as well as the properties of the filter bed used and this can be experimentally determined in advance. The amount suitable for spreading is usually in the range of 1∼10 cm. in terms of the depth of the sludge layer above the filter bed, but, in view of the fact that the dehydration begins as soon as the sludge is spread on the filter bed, it is not advisable to determine said amount on the basis of the depth of sludge after completion of its pouring; said amount should be determined considering the total amount to be poured in. As to the means of pouring and spreading the sludge, it is advisable to distribute it uniformly all over the filter bed by shifting the position of the feeding nozzle. But, in case a large amount of sludge is to be spread, even the use of a fixed nozzle will suffice as the sludge will flow to become distributed all over the surface of the bed. The raking off of the sludge is desirably performed by means of a scraper capable of horizontal movement at a specified elevation so as to scrape evenly a thin surface portion of the filter bed.

In the present invention, it is also possible to facilitate the treatment of the sludge by adding an organic coagulent to the sludge in advance, spreading the sludge thus pretreated on the filter bed to effect a rapid dehydration and raking off the dehydrated sludge together with a surface portion of the layer of filter material.

As the organic coagulant for use on this occasion, in case the sludge is charged with negative electricity, a cationic organic coagulant is selected, while, in case the sludge is charged with positive electricity, an anionic organic coagulant is selected. The applicable cationic organic coagulants include water soluble organic compounds whose polymer is possessed of a multiplicity of cation radicals like amino radical, imino radical and quaternary ammonium radical, for instance, those compounds obtained by cationizing such polycyclic compound condensate as polyvinylpyridine salt, water soluble polyethyleneimine, amine-epichlorohydrin polycondensate, aniline-Formalin polycondensate, vinyl benzyl ammonium compound, petroleum tar, petroleum pitch, coal tar, coal pitch, etc., while the applicable anionic organic coagulants include those substances obtained by partial hydrolysis of the polymer as well as copolymer of the water soluble salt of acrylic acid, methacrylic acid, etc. and the polymer as well as copolymer of acrylamide, acrylonitrile, etc.

According to the method of dehydrating the sludge upon adding an organic coagulant thereto as above, the dehydration efficiency can be remarkably improved compared with the conventional sludge-drying bed.

Given in the following is an example of the results of experiments according to this method.

A dehydration tank having the filtration area of 3 m.$^2$ was packed with pulverized coal having the grain size of 4∼5 mm. to a depth of 3 mm. deep, and, above the layer of pulverized coal thus packed, a filter bed was provided by packing with coal having the grain size of 0.3∼1.0 mm. to a depth of 20 cm. deep. When an active sludge (concentration: 25,600 p.p.m.) coming from a sewage treatment process and containing an organic coagulant to the extent of 200 p.p.m. was poured in said tank to effect dehydration, the result was as indicated by the curve (b) of the graph in the appended FIG. 2. As evident from this showing, there takes place a very rapid dehydration of the sludge immediately after the pouring of the sludge and then the dehydration continues rapidly—though at a slightly reduced speed—till about 40 minutes thereafter, but it makes little progress thereafter.

Inasmuch as there takes place a rapid dehydration immediately after the pouring of sludge and the clogging of filter bed follows thereafter, it is natural that the dehydration should be efficiently performed by means of raking out the clogged surface of the filter bed together with the sludge deposited thereon and exposing a new surface of the filter layer free of said clogging to thereby resume the rapid dehydration. Besides, as stated in the foregoing, the speed of dehydration in case an organic coagulant is added to the sludge to be treated is much higher than that in case of the treatment of sludge without adding any organic coagulant, and the concentration of solid matters in the sludge raked out after dehydration is also augmented.

The raking out of the surface of the filter bed means the raking out of the deposited sludge together with the clogged portion of the surface layer of filter bed, so that the sludge thus discharged contains mixed therein a portion of the pulverized coal used as the filter material, and accordingly, it is possessed of a heating value enhanced thereby and is in a condition suitable for combustion. The water content of said sludge is in the range of 60∼75%—the range permitting combustion of the sludge as it is—but it may be further lowered by dehydration with a compressor.

According to the present invention, the dehydrated sludge can be subjected to combustion as it is and therefore it is quite easy to dispose of. Besides, even a putrefactive sludge can be readily disposed of, so that there is no necessity for resorting to any pretreatment for stabilization such as the digestion process in the prior art.

BRIEF DESCRIPTION OF THE DRAWINGS

FIG. 6 is a cross sectional view taken along the line I—I in FIG. 5. FIG. 7 is a schematic vertical section view taken along the line II—II in FIG. 6. FIG. 8 is a perspective view of the filter material-spreading device. FIG. 10 is a schematic vertical section view taken along the line V—V in FIG. 9.

In FIG. 4, the dehydration tank A consists of the supporting bed B which is composed of gravel, coal, etc., on the bottom thereof, the drain pipe C laid under the supporting bed B, and the filter bed D composed of pulverized coal layered on top of the supporting bed B. The truck E, which travels along the side wall of the dehydration tank A, is provided with the rake G, the sludge-discharging pipe H and the sludge-spreading pipe I suspended by the rack F. After adjusting the elevation of the rake G, the truck E travels in the direction of the arrow, scrapes off the sludge deposited on the surface of the filter bed D with the rake, discharges said sludge through the sludge-discharging pipe H, and immediately thereafter spreads new sludge uniformly through the sludge-spreading pipe I. The spread sludge is dehydrated while staying on the filter bed, and the water flowing down therefrom is discharged through the drainpipe disposed under the filter bed. By fixing the traveling cycle of the truck in the range of 2∼30 minutes and spreading the sludge in such amount as to permit the free water therein to pass into the filter bed so that the sludge is completely dehydrated during the cycle thus fixed, the dehydration of sludge can be effected at high speed. The speed of the sludge dehydration according to the present invention is several hundred times as high as in the conventional sludge-drying bed.

Figure 1:
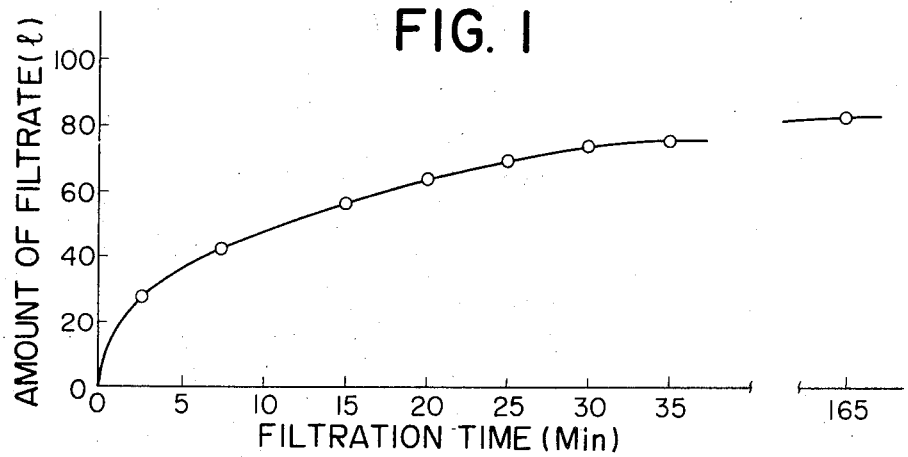
FIGS. 1 to 3 are graphs illustrating the progress of filtration under various operating conditions.

The present apparatus of FIGS. 5 to 12 features the center shaft disposed in the center of the dehydration tank and so devised as to ascend and/or descend while rotating, said shaft being provided with: the filter material-spreading pipe for use in spreading the filter material when the shaft ascends; the sludge-spreading casing for use in spreading the sludge when the shaft descends; the rake for use in raking off the dehydrated sludge; and the device for use in discharging the raked-off, dehydrated sludge.

The sludge-treating apparatus comprises: the center shaft 11 disposed at the upper center of the hollow cylindrical tank 1 and so devised as to be capable of rotation as well as ascent and descent, the filter material-spreading device 2 for use in spreading the filter material, the sludge-spreading device 3 for use in spreading the sludge on said filter material, the sludge-collecting device 4 for use in raking off the filtered and dehydrated sludge together with the filter material and the sludge-discharging device 5 for use in discharging the sludge thus raked off, which are all fixed on said center shaft.

The tank 1 is of hollow cylindrical shape and is provided with the hopper 6 on the center of the bottom thereof. Around the hopper 6, there are fixed the annular base plate 7 which is almost funnel-shaped in cross-section. At appropriate positions on said base plate, there are formed the filtrate outlets 8, and at a fixed elevation above the base plate 7, there is installed the supporting plate 8' provided with openings. On said supporting plate 8', there is appropriately built the filter layer 7' (composed of coal in the shape of small lumps, grains or near powder). On the center of the roof, there is fixed the tapped bearing 9 into which is screwed a shaft 11 provided with a screw 10 of a fixed pitch. One end of said center shaft 11 outside the tank 1 is connected to the motor M by means of the belt 12, and, inside the tank 1, there is fixed the trough 13 surrounding said shaft 11 at a position at about the middle thereof. The other end of said shaft is integrated with the hollow rotor 14, and the lower end of said rotor 14 is fitted into the opening of the hopper 6 so as to permit the rotation as well as ascent and descent of the rotor. 15 denotes the opening provided on the center shaft 11 which opens near the bottom of the trough 13 and is interconnected with the filter material-spreading pipe 17 connected to the end of the shaft 11 through the hollow portion 16 provided on the lower end of said shaft.

The filter material-spreading device 2 consists of the filter material-spreading pipe 17, which extends horizontally from the lower end of the center shaft 11 to the side wall of the tank 1 by penetrating the side wall of the rotor 14 and provided with the filter material-spreading orifices 18 disposed at regular intervals and opening slantwards or horizontally relative to the surface of the filter bed 7'.

The sludge-spreading devices 3 each consist of a casing fixed to the outside wall of the rotor 14 to extend horizontally toward the side wall of the tank 1, said pipe being cut open at the upper portion thereof so as to have a generally U-shaped section while the lower portion thereof is provided with the sludge-spreading orifices 19 which has the shape of a square spout protruding horizontally. The sludge-spreading casings 21 accommodate the stock tanks 20 of which one is disposed near the filter material-spreading pipe 17 of said filter material-spreading device 2, while the other is disposed on the opposite side relative to the axis of the rotor 14 so that the tanks 20 are almost diametrically aligned with each other. Into said stock tanks 20 are placed the sludge-feeding pipes 22 connected with two sides of the lower part of said trough 13. To make the sludge flow out from these stock tanks 20, there can be used such techniques as making it overflow the tank, or making it flow out through orifices provided on the bottom of said tank, or the like. It is advisable to adopt an appropriate means as the occasion demands.

The sludge-collecting device 4 consists of a couple of curved rakes 23 fixed to the outer wall of the rotor 14 symmetrically relative to the axial direction of said rotor. One of said rakes 23 is so devised that it is disposed near the filter material-spreading pipe 17 and on the side opposite to the sludge-spreading casing 21 while curving in a direction away from said casing 21. The curvature of the rake 23 is not necessarily limited and any of such curves as logarithmetic spiral (or Archimedean curve), semi-circumferential curve or the like is applicable as long as the rake is capable of functioning to draw the raked sludge towards the rotor 14.

The sludge-discharging device 5 consists of the sludge outlets 24 formed by cutting a part of the wall of the rotor 14 embraced by the curve of the rake 23 and the hopper 6. The cake of sludge drawn towards the wall of the rotor 14 by virtue of rotation of the rake 23 enters the hopper 6 through the sludge outlet 24 and falls on the conveyor (not shown herein). 25 denotes the sludge-feeding pipe provided with the pump P disposed halfway thereof, and its one end is introduced into the trough 13. 26 denotes the filter material-feeding pipe provided with the pump $P_2$ disposed half-way thereof, and its one end is introduced into the filter material-storing tank 27 installed by the side of the tank 1 while the other end is introduced into the trough 13. 28 denotes the stirrer, and 29, 30 and 31 denote the valves respectively.

Referring to the function of the present apparatus, when the center shaft 11 is rotated by the motor M, said shaft 11 ascends or descends by 1 pitch (2 mm.) per one rotation. If the center shaft 11 is made to ascend by the rotation in the direction of the arrow marked Y, the trough 13, the rotor 14 as well as the filter material-spreading pipe 17, sludge-spreading casings 21 and rake 23 integrated with said rotor 14 will rotate in bloc and be elevated by 1 pitch per one rotation. By closing the valve 29 of the sludge-feeding pipe 25 and opening the valve 30 of the filter material-feeding pipe 26 as well as the valve 31 of the filter material-spreading pipe 17 during the ascent of the shaft 11, the filter material coming from the filter material-storing tank 27, wherein coal is stored as a slurry by means of the pump $P_2$ and entering the trough 13 through the filter material-feeding pipe 26 is made to enter the filter material-spreading pipe 17 through the opening 15 and the hollow portion 16 of the lower part of the shaft to be spread on the filter layer 7' from the spreading orifices 18 to form a layer of a fixed depth. Upon obtaining a layer of desired depth, the valves 30 and 31 are closed to thereby discontinue the feeding of filter material, and subsequently the rotation of the center shaft 11 is reversed by means of the motor M to thereby make the shaft 11 descend. When the lower edge of the rake 23 gets near the surface of the layered filter material, the valve 29 of the sludge-feeding pipe 25 is opened to make the sludge flow into the trough 13, whereby the sludge is fed to the storing tanks 20 within the sludge-spreading casing 21 through the sludge-feeding pipes 22 connected to the trough 13. When the sludge in the storing tank 20 comes up to a fixed amount, it overflows and runs spreading casings 21 through the sludge-feeding pipes 22 spreading casings 21, whereby the sludge is spread continuously to form a relatively thin layer on the filter material. The free water contained in the sludge thus spread rapidly penetrates the layer of filter material and flows down leaving the sludge cake on the filter material. After about a half rotation of the rotor 14, the rake 23 located on the opposite side of the sludge-spreading case 21 engaged in said sludge-spreading rakes off the cake together with a portion of the filter material beneath said cake by the depth of about 1 pitch (2 mm.) and sends them along the curve of the rake into the rotor 14 through the sludge outlet 24 formed on the rotor 14 through the hopper 6 to have them discharged onto the conveyor (not shown herein) disposed below said rotor. The sludge flowing out continuously from a couple of sludge-spreading casings 21 is discharged after raking off of the cake with the rake 23, by virtue of the succeeding half rotation of said rotor, and, at this time, the surface portion of the filter material layer which has been clogged by the cake is scraped off as the rake passes thereon, whereby there is always exposed a new surface of the filter material and a rapid penetration of water can be expected.

When the layer of the filter material gets thin as it is scraped off by a fixed depth together with the cake of sludge with each rotation of the rotor 14, the valve 29 is again closed to discontinue the feeding of sludge, the shaft 11 is made to ascend by reversing its rotation, and feeding the filter material by opening the valves 30 and 31, whereby the layer of filter material in the tank is replenished to a fixed depth. Upon thus obtaining a fixed depth of the layer of filter material, the rotation of the shaft 11 is again reversed to make the shaft descend, and the dehydration is effected by repeating the same process as above. In this connection, when there is a necessity for cleaning the interior of the apparatus, said cleaning is performed by introducing a backward flow of water into the outlets 8 and making it overflow the trough 32 surrounding the apparatus through the window provided on the wall thereof.

As stated in the foregoing, inasmuch as the present apparatus comprises the rotary center shaft which is capable of vertical movement and installed in the tank and the filter material-feeding pipe which is capable of regulating the spreading of filter material and fixed on said center shaft integratedly, it renders it possible to replenish the filter material layer appropriately whenever the filter material decreases as it is scraped off with the rotation of the shaft. Besides, inasmuch as it is provided with the rake for scraping off the sludge together with the filter material and the sludge-spreading case for spreading the sludge which are disposed at different elevations so that the scraping of the dehydrated cake as well as the surface layer of the filter material follows in the wake of the sludge-spreading at regular intervals to expose a new surface of the filter material, the dehydration speed as well as rate is high and the subsequent incineration of the sludge is facilitated. Moreover, it has such merit that the spreading, collection and discharge can be performed continuously and much more efficiently thereby bringing about a superb effect in the sludge disposal.

EXAMPLE 1

When the pulversized coal (water content: 42%) having the grain size of 0.3~3 mm. was packed 20 cm. deep in a dehydration tank having the filter area of 3 m.² (1 m. x 3 m.) and the active sludge coming off the sewage treatment and having the concentration of 3000 p.p.m. was spread on the surface of the filter bed by 100 l. so as not to disorder said surface, the water began to sink immediately and the free water of the sludge disappeared in 1.5 minutes. By operating the rake, the dehydrated sludge together with the upper portion of the filter bed to the extent of 2 mm. deep was scraped off, and immediately thereafter the same amount of the sludge as above was spread on the filter bed, thereby repeating the dehydration and scraping of the sludge. The time required for removing the free water from the sludge in the wake of the spreading thereof did not change even after repeating this operation 10 times. The dehydration speed per unit area of the present filter bed was 1.33 m./hr.: this is much higher than that of the conventional sludge-drying bed, which is usually 0.0012 m./hr. The water content of the sludge thus raked out was 76%, and it was capable of direct incineration with the incinerator.

EXAMPLE 2

When the sludge was fed by 300 l. to the same apparatus under the same condition as in Example 1, it took 23 minutes to remove the free water from said sludge. The dehydration speed in this case was 0.26 m./hr.

EXAMPLE 3

When the active sludge having the concentration of 12,000 p.p.m. was fed by 50 l. to the same apparatus under the same condition as in Example 1, the free water disappeared in 6 minutes, and the dehydration speed was 0.17 m./hr. Even after 10 times repetition of the same operation as above, this hydration speed did not change at all. The water content of the sludge thus raked out was 72%.

EXAMPLE 4

A filtration/dehydration tank having the filter area of 3 m.² and a depth of 0.8 m. was prepared. The coal grains having the grain size of 4~5 mm. were packed 3 cm. deep on the bottom of said tank, and on the layer of said coal grains was packed pulverized coal having the grain size of 0.3~1.0 mm. thereby forming a 20 cm.-deep filter bed. The density of the air-dried filter material packed on this occasion was 0.75. Prior to the packing, the coal grains were wetted by dipping them in water. Meanwhile, 750 l. of the concentrated sludge (concentration: 25,600 p.p.m.) obtained through the pressure flotation process of an active sludge (concentration: 7,500 p.p.m.) arising from the biological treatment of sewage was mixed with 300 p.p.m. of a cationic organic coagulant (cation-modified polycyclic compound condensate such as having the atomic ratio of $H/C$ in the range of 1.3~0.4). When this sludge was spread on the foregoing filter bed so as not to disorder the surface thereof, the water began to sink immediately and the free water of the sludge disappeared in 5 minutes. By operating the rake, the dehydrated sludge together with the upper portion of the filter bed to the extent of 2 mm. deep was scraped off, and immediately thereafter the same amount of the concentrated sludge containing the organic coagulant as above was spread on the filter bed, thereby repeating the dehydration and scraping of the sludge. The time required for removing the free water from the sludge in the wake of the spreading thereof did not change even after 10 times repetition of this operation. The dehydration speed per unit area of the present filter bed was 0.50 m./hr.: this is much higher compared with that of the conventional sludge-drying bed, which is usually 0.0003 m./hr., and that in case of the filter bed employing no coagulant, which is usually 0.03 m./hr. The concentration of solid matters in the cake was 9%, and this proves high dehydration rate of the present filter bed compared with 3.6% in case of the filter bed employing no coagulant. The sludge raked out from the present bed was capable of direct incineration with the incinerator.

Figure 2:
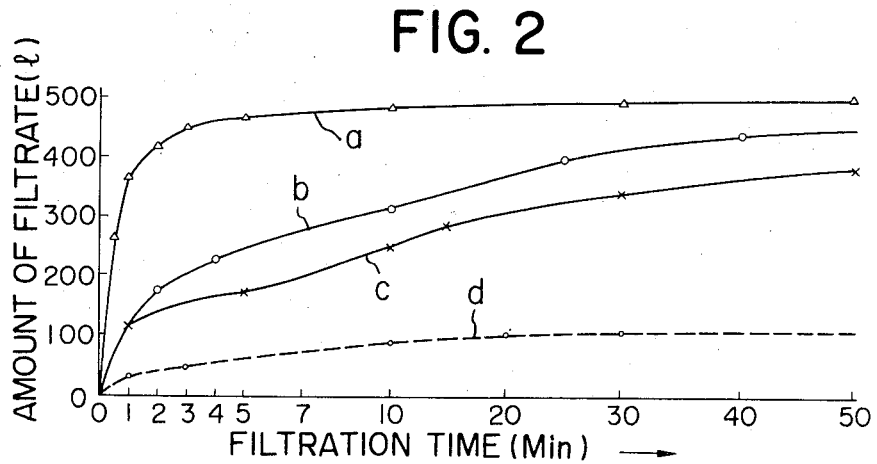

In this connection, given in FIG. 2 is the comparative dehydration performance in case of the treatment of the foregoing highly concentrated solid sludge upon adding an organic coagulant thereto and without adding the same thereto. (In said FIG. 2, the amount of the coagulant added is 300 p.p.m. in case of sludge a, 200 p.p.m. in case of sludge b, 100 p.p.m. in case of sludge c, and 0 in case of sludge d.) As evident from FIG. 2, in case an organic coagulant as added, a very rapid dehydration took place immediately after spreading of the sludge, and this phenomenon was particularly conspicuous in case the organic coagulant was added in a large amount. This rapid dehydration continued—though at a speed slightly slowed down—till about 40 minutes thereafter, and it made little progress thenceforward.

EXAMPLE 5

Figure 3:
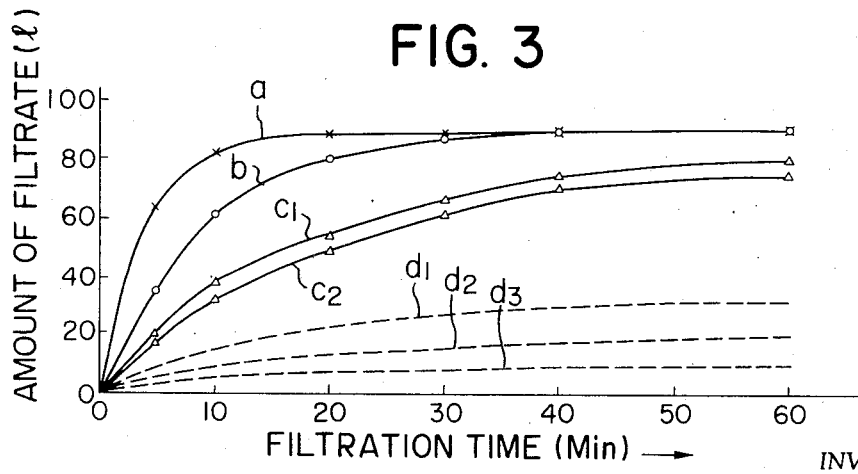
Figure 4:
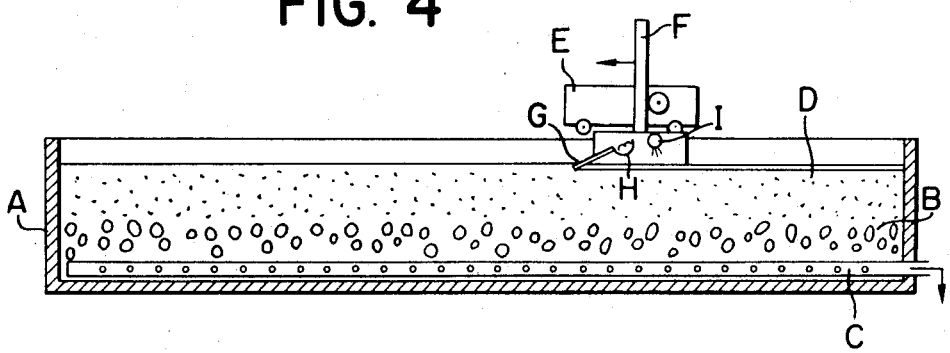
FIG. 4 is a schematic central sectional view of an apparatus for carrying out the invention.
Figure 5:
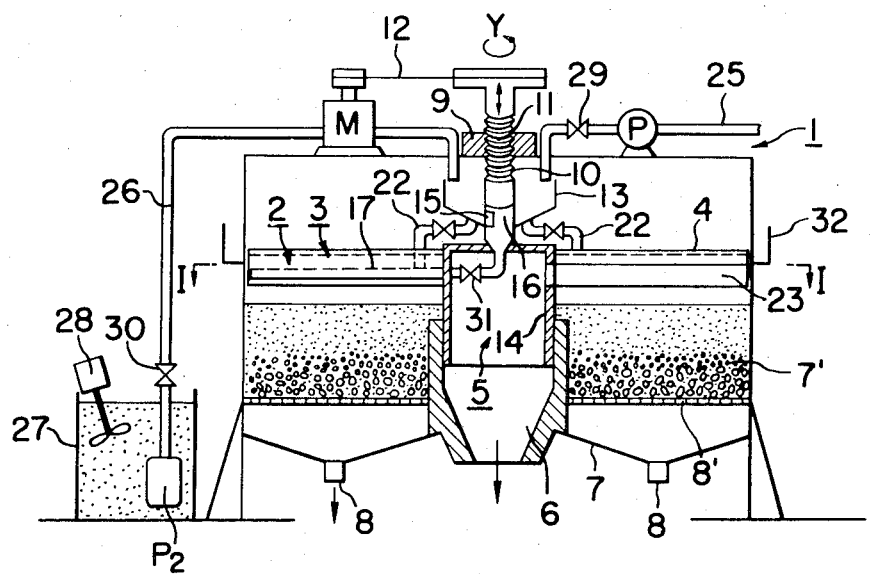
FIG. 5 is a schematic vertical sectional view of another apparatus for use in practicing the present invention.
Figure 9:
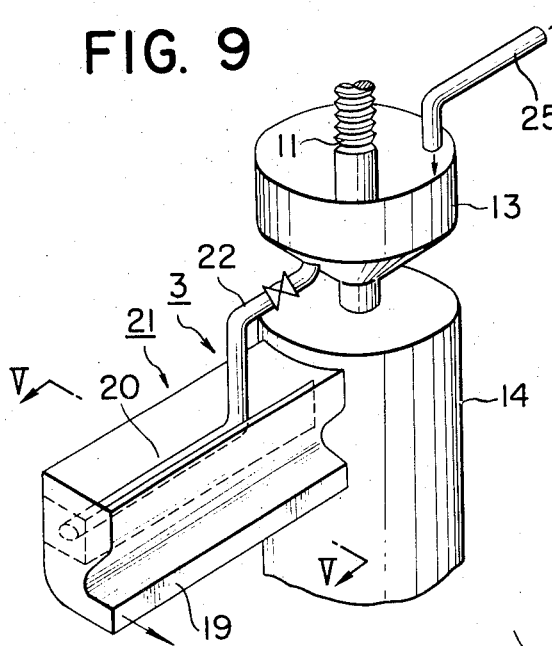
FIG. 9 is a perspective view of the sludge-spreading device.
Figure 11:
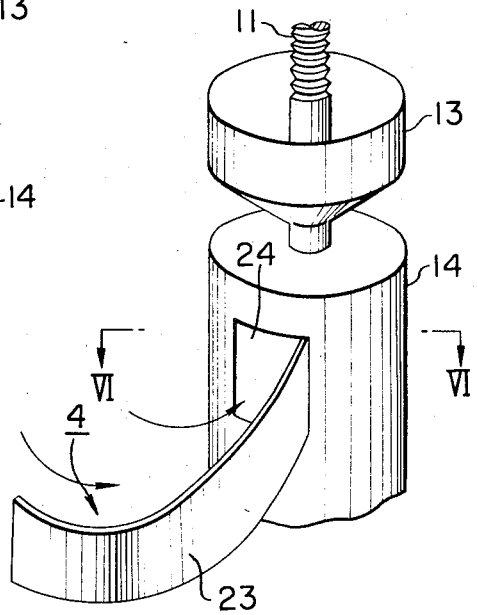
FIG. 11 is a perspective view of the sludge-discharging device.
Figure 12:
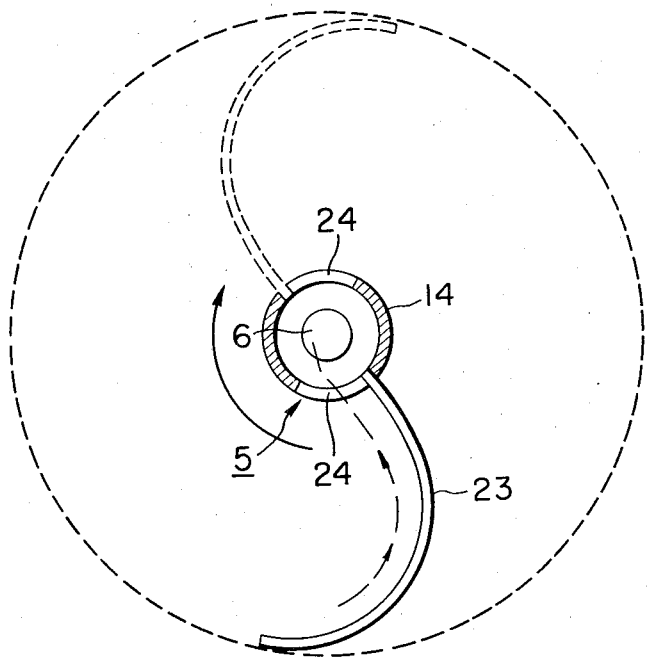
FIG. 12 is a cross sectional view taken along the line VI—VI in FIG. 11.

The precipitated slip having the water content of 95 wt. percent (concentration: 25,600 p.p.m.) obtained through 24 hours natural sedimentation of the treated suspension arising from the wet-classification of psammite from a sand-stratum consisting of clay, silt and psammitic clay was mixed with 300 p.p.m. of partially hydrolyzed acrylamide. When 100 l. of this mixed liquid (sludge) was spread on the filter bed of the same apparatus as in Example 1 above so as not to disorder the surface thereof, the water began to sink immediately and the free water of the sludge disappeared in 10 minutes. Even after 8 times repetition of the same operation as in Example 1 subsequent thereto, the time required for removing the free water from the sludge in the wake of the spreading thereof did not change at all. The dehydration speed per unit area of the filter bed was 0.2 m./hr.: this is much higher than that of the conventional sludge-drying bed, which is usually 0.0004 m./hr. The water content of the sludge thus raked out was 50%—remarkably lower than 78.5% for the sludge not employing the coagulant, and the present sludge could be thrown away just in that condition. In this connection, given in FIG. 3 is the comparative dehydration performance in case of the treatment of the sludge upon adding thereto an organic coagulant and without adding the same thereto. (In said FIG. 3, the amount of the coagulant added and the water content of the sludge 60 minutes after the addition thereof were respectively: 300 p.p.m. and 49.5% in case of sludge $a$; 200 p.p.m. and 49.5% in case of sludge $b$; 100 p.p.m. and 60.2% at the time of the first operation in case of sludge $c_1$, 100 p.p.m. and 63.8% at the time of the second operation in case of sludge $c_2$; 0 p.p.m. and 78.5% at the time of the first operation in case of sludge $d_1$; 0 p.p.m. and 80.0% at the time of the first operation in case of sludge $c_1$; 100 p.p.m. and 81.5% at the time of the third operation in case of sludge $d_3$.) As evident from FIG. 3, in case an organic coagulant was added, a very rapid dehydration took place immediately after spreading of the sludge, and this phenomenon was particularly conspicuous in case the organic coagulant was added in a large amount. This rapid dehydration continued—though at a speed slightly slowed down—till about 40 minutes thereafter, and it made little progress thenceforward. Meanwhile, in case said organic coagulant was not added, the sludge came to stay in the filter layer composed of fine particles to form a watertight filter layer, so that subsequent filtration was impossible even after the surface layer of the filter bed was scraped off.

We claim:

1. A filtration apparatus for use in treating sludge, comprising:
   an upright tank having in the lower portion thereof a filter bed composed of pulverized coal;
   an upright, rotatable, centrally disposed shaft mounted in said tank and means for raising and lowering said shaft in said tank;
   means coupled to said shaft and positioned above the upper surface of said bed for spreading pulverized coal on the upper surface of said bed when said shaft is being raised in said tank;
   means coupled to said shaft and positioned above the upper surface of said bed for spreading sludge on the upper surface of said filter bed when said shaft is being lowered;
   rake means coupled to said shaft and positioned above the upper surface of said bed for scraping off the surface layer of said bed when the shaft is being lowered; and
   a sludge-discharging device positioned for receiving from the rake means the scraped-off surface layer of said filter bed for discharging same from the tank.

2. A filtration apparatus according to claim 1, in which said rake means has a curved shape for directing the scraped-off surface layer toward said shaft and discharge means associated with said shaft for discharging the scraped-off surface layer from the tank.

3. A filtration apparatus according to claim 1, in which said sludge-spreading means comprises at least one hollow pipe above the bed and extending from the shaft substantially to the wall of said tank, said pipe having orifice means for discharging material onto said bed, and valve-controlled means for selectively supplying sludge to said pipe.

4. A filtration apparatus according to claim 3, in which said rake means comprises at least one elongated scraping blade extending from said shaft substantially to the wall of said tank, said blade being positioned with respect to said pipe so that it precedes said pipe during rotation and simultaneous descending movement of said shaft.

5. A filtration apparatus according to claim 4, in which the means for spreading pulverized coal on said bed comprises a second pipe extending from said shaft substantially to the wall of said tank and valve means for controlling flow of pulverized coal into said second pipe, said second pipe being positioned between said blade and said first-mentioned pipe.

6. A filtration apparatus according to claim 5, including a trough mounted on said shaft above said bed, valve-controlled means for alternatively supplying to said trough (1) pulverized coal and (2) sludge, and further valve-controlled means for alternatively directing the contents of said trough to said first-mentioned pipe and said second pipe.

7. A filtration apparatus for use in treating sludge, comprising:
   an upright tank having a central collecting hopper projecting upwardly from the bottom thereof, said tank having a filter bed composed of pulverized coal in the lower portion thereof surrounding said hopper;
   an upright, rotatable, centrally disposed shaft mounted in said tank above said hopper and having a hollow rotor portion at its lower end slidably telescoping the upper end of said hopper;
   means for raising and lowering said shaft;
   means for spreading sludge on the upper surface of said filter bed when said shaft is being lowered;
   rake means coupled to said shaft and positioned above the upper surface of said bed for scraping off the surface layer of said filter bed when the shaft is being lowered and for directing the scraped-off filter bed material to said rotor;
   said rotor having opening means so that the scraped-off filter bed material can pass into the interior of the rotor and thence into the hopper.

References Cited

UNITED STATES PATENTS

| | | | |
|---|---|---|---|
| 877,197 | 1/1908 | Hunt | 210—270 X |
| 659,916 | 10/1900 | Davis | 210—271 X |
| 297,364 | 4/1884 | Farquhar et al. | 210—272 |
| 1,574,556 | 2/1926 | Coe | 210—272 X |
| 3,401,114 | 9/1968 | Carlton et al. | 210—272 X |

MICHAEL ROGERS, Primary Examiner

U.S. Cl. X.R.

210—272